United States Patent [19]

Eidsmore

[11] Patent Number: 5,636,876
[45] Date of Patent: Jun. 10, 1997

[54] FLUID COUPLING ASSEMBLY

[76] Inventor: Paul G. Eidsmore, 1700 Granite Creek Rd., Santa Cruz, Calif. 95065

[21] Appl. No.: 242,374

[22] Filed: May 13, 1994

[51] Int. Cl.$^6$ ............................................. F16L 35/00
[52] U.S. Cl. ........................... 285/39; 285/328; 285/353; 285/387; 285/906
[58] Field of Search ................................ 285/387, 388, 285/328, 353, 384, 175, 39, 330, 906

[56] References Cited

U.S. PATENT DOCUMENTS

| 405,745 | 6/1889 | Ross | 285/175 X |
|---|---|---|---|
| 473,462 | 4/1892 | Hogan | 285/387 X |
| 568,996 | 10/1896 | Totham | 285/330 X |
| 1,244,100 | 10/1917 | Kortas | 285/387 X |
| 1,326,970 | 1/1920 | Row et al. | 285/175 X |
| 1,455,971 | 5/1923 | Rickenbacker et al. | 285/330 |
| 1,525,233 | 2/1925 | Erickson | 285/175 X |
| 1,589,781 | 6/1926 | Anderson | 285/330 |
| 2,926,027 | 2/1960 | Morquis | 285/175 X |
| 3,113,792 | 12/1963 | Brown | 285/388 X |
| 3,428,337 | 2/1969 | Read | 285/387 X |
| 3,521,910 | 7/1970 | Callahan, Jr. et al. | |
| 4,544,185 | 10/1985 | Weirich | 285/387 X |
| 5,088,773 | 2/1992 | Gralenski | 285/328 X |

FOREIGN PATENT DOCUMENTS

| 491511 | 11/1975 | Russian Federation | 285/388 |

*Primary Examiner*—Dave W. Arola
*Attorney, Agent, or Firm*—Fay, Sharpe, Beall, Faga, Minnich & McKee

[57] ABSTRACT

A new fluid coupling assembly includes first and second split connection members positioned over a coupling member or gland of a fluid system. A body member is threadedly received over one end of the split connection members to define a split female nut member. A second threaded region of the body member has a different pitch and hand to facilitate make-up of the coupling assembly and assure that the components are urged together as the fluid components are brought into sealing engagement. A retaining collar is received over the split connection members to define a split male nut member.

17 Claims, 3 Drawing Sheets

5,636,876

FLUID COUPLING ASSEMBLY

BACKGROUND OF THE INVENTION

This invention pertains to the art of coupling arrangements and more particularly to fluid coupling assemblies of the type where first and second fluid components, such as axially aligned glands are brought into sealing engagement. A widespread, commercially successful version of this type of fluid coupling employs a circumferentially continuous bead on a radial end face of the gland. A gasket is interposed between the opposed beads and the glands urged into fluid-tight relationship with opposite faces of the gasket by virtue of a threaded nut arrangement. For example, one of the glands is provided with a shoulder axially spaced from the end face and that abuttingly engages a corresponding shoulder of a coupling nut. An outer end of the nut is internally threaded to cooperate with external threads associated with the second coupling gland. The external threads may be formed directly on the second gland at a region spaced from the end face, or may be associated with a separate nut member that likewise abuttingly engages a radial shoulder on the second coupling gland. A commercially successful version of this fluid coupling assembly is shown and described in U.S. Pat. No. 3,521,910 of Callahan, Jr., et al.

The coupling glands are usually associated with other components of the fluid system. For example, the ends of the glands remote from the sealing end faces are secured to fluid lines, pressure regulators, valves, etc. As will also be recognized by those skilled in the art, these types of fluid couplings are often used in ultra pure environments where high degrees of cleanliness are required. Steps must be taken, for example, when a welded interconnection is made between the first gland and the fluid component to address the cleanliness problem.

Yet another problem associated with securing the gland member to the fluid component relates to misalignment due to welding. Occasionally, the first gland is warped or non-aligned relative to its ideal location in connection with a stub or other connection associated with the fluid component. Aside from any aesthetic concerns, non-alignment can adversely impact the connection and alignment of other components in the fluid system.

Accordingly, these concerns and others have not been adequately addressed in prior art arrangements of fluid couplings of this type.

SUMMARY OF THE INVENTION

The present invention contemplates a new and improved fluid coupling assembly that overcomes these problems and others and provides a simple, economical, clean, and accurate fluid coupling arrangement for securing together components in a fluid system.

According to the present invention, there is provided a connection member that is longitudinally split to allow the connection member to be secured in place after the gland has been secured to or is integral with the fluid component.

According to another aspect of the invention, the split connection member cooperates with a body member. The body member threadedly engages with the split connection member.

According to another aspect of the invention, the body member has first and second threaded regions of different pitch and opposite hand for retaining the split connection member together and securing the glands together.

A principal advantage of the invention is the ability to locate the connection member over the gland after the gland has been connected to an associated fluid component.

Another advantage of the invention resides in the use of threads of a different pitch and opposite hand to facilitate make-up of the coupling assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
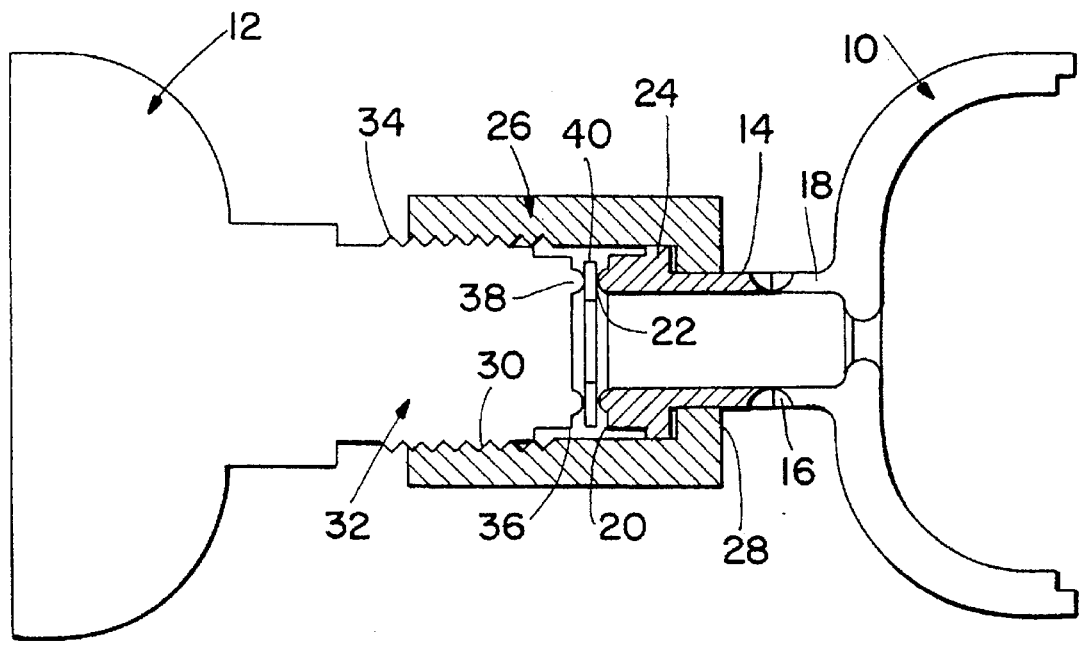
FIG. 1 is a sectional view of a fluid system in accordance with a prior art coupling assembly arrangement.

Referring now to the drawings wherein the showings are for purposes of illustrating the preferred embodiments of the invention only and not for purposes of limiting same, the FIGURES show a fluid system A in which fluid components B are interconnected by a coupling assembly C. As shown in FIG. 1, reference is initially made to a prior art arrangement or fluid system A in which a fluid supply or upstream component 10 is connected to a downstream component 12, such as a pressure regulator, by a known coupling assembly B. The coupling assembly includes a first coupling member or gland 14 welded at 16 to a stub or extension 18 that extends outwardly from the second fluid component. The first coupling member includes an end face 20 having a circumferentially continuous bead 22 protruding therefrom.

Disposed axially from the end face is an enlarged radial shoulder 24. The shoulder cooperates with a coupling nut 26, particularly a radially inwardly extending shoulder 28 of the coupling nut. An outer end of the coupling nut is internally threaded at 30 for engagement with a second coupling gland 32, particularly an external threaded region 34. The second coupling gland also includes a sealing end face 36 that has a bead 38 protruding therefrom in facing relation to the first coupling gland.

Preferably a gasket or seal member 40 is interposed between the beads for establishing an effective sealed arrangement. The gasket is preferably formed from a material softer than the beads of the first and second glands. When the glands are axially advanced toward one another by rotating the coupling nut onto the threads 34, sealed coupling assembly is achieved as the beads establish sealing contact with opposite faces of the gasket.

Since the through opening that defines the shoulder 28 of the coupling nut has a smaller internal diameter than shoulder 24 of the first gland, it is necessary to position the coupling nut 26 over the gland prior to welding the first gland at 16 to the fluid component 12. During this welding operation, the nut 26 freely dangles over the first gland. Accommodations must be made to assure that the coupling nut does not interfere with the welding operation or final welded connection. Again, details of this type of conventional coupling assembly are well known in the art.

Figure 2:
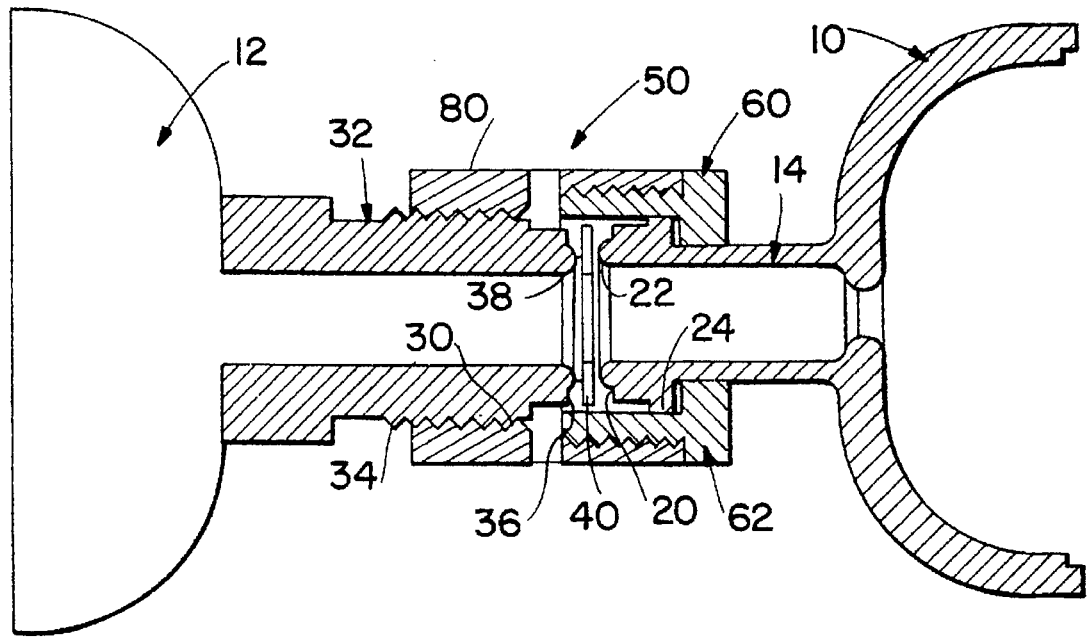
FIG. 2 is a longitudinal cross-sectional view of a fluid system similar to FIG. 1 and incorporating the new coupling assembly.
Figure 3:
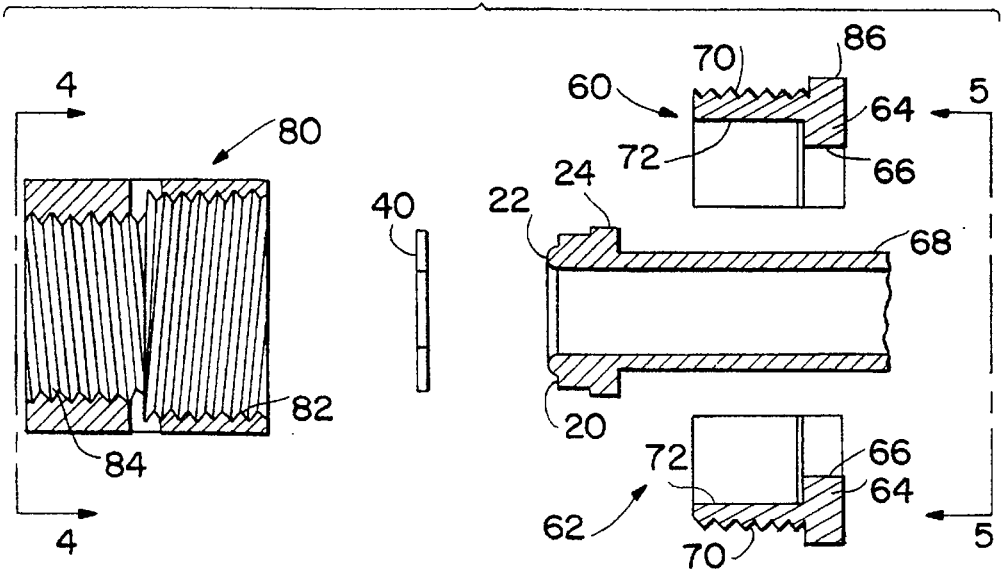
FIG. 3 is an exploded view of the subject new coupling assembly.

FIGS. 2 and 3 show a new coupling assembly 50 for joining together first and second coupling members or coupling glands. Like numerals will be used to refer to like components while new numerals will refer to the new coupling assembly. As is evident from a comparison of FIGS. 1 and 2, the overall fluid system is generally the same, although the first gland 14 is shown as being integrally formed with the second fluid component 12 for reasons which will become more apparent below. The modified coupling assembly 50 comprises three major components. Specifically, first and second connection members or split nut halves 60, 62 define two of the three major components of the coupling assembly. Description of one split nut half is equally applicable to the other so that common reference numerals will be used to indicate like elements. Each split nut half has an enlarged shoulder 64 (FIG. 3) at a first end that has an inner predetermined dimension defined by a recess 66 that, when combined with the other split nut half, closely matches the external diameter 68 of the first gland. As is also apparent, the recess 66 is dimensioned substantially less than the radial shoulder 24 of the first gland.

The opposite end of each split nut half has a threaded region preferably defined by an external threaded region 70. Although other thread pitch and hand arrangements can be used, in accordance with a preferred arrangement, the external threads 70 have a twenty pitch left-hand thread. A counterbore 72 extending inward from the opposite end of each split nut half has a diameter sufficiently greater than that of shoulder 24 of the first gland. When arranged in cooperative engagement as shown in FIG. 2, the split nut halves define a circumferentially continuous shoulder 64 that abuttingly engages a radial face of shoulder 24 on the first gland. Likewise, the circular recess or counterbore 72 is closely received over the radial shoulder and extends axially a distance beyond the end face 20 and bead 22 of the first coupling gland. The split nut halves preferably terminate adjacent the location of the end face 36 of the second coupling gland 32 with the sealing gasket 40 being received between the circular beads 22, 38.

A third component of the new coupling assembly is defined by a body member 80. As best shown in FIG. 3, the body member is of annular configuration, i.e., circumferentially continuous, and has first and second threaded regions 82, 84. The first threaded region 82 defines a set of internal threads that extend axially inward from a first end of the body member and terminate approximately mid-way therein. The threads have the same pitch and hand as the threads 70 defined by the split nut halves.

The second threaded region 84 extends axially inwardly from the opposite end of the body member. The second threaded region has a preselected pitch and hand that mates with the thread pitch and hand 74 of the second gland 32. Although not limited thereto, in a preferred embodiment, the second threaded region has an eighteen pitch right-hand thread. Thus, the second threaded region is of opposite hand from the first threaded region, and has different pitch. This relationship of the opposite hand and different pitches for the first and second threaded regions assures that the body member will not loosen but will tighten on the split nut halves. That is, once the split nut halves abut against the first gland and friction develops between the contacting shoulders and limits rotation of the split nut halves relative to the first gland, the opposite thread and different thread pitches will encourage the body member to tighten on the split nut halves.

As referenced above, the first gland can now be integrally formed with the fluid component 12 with which it is associated in accordance with the teachings of the present invention. Stated another way, a single piece of stock material can be machined to form at least a portion of the fluid component 12, as well as the first gland 14. This eliminates the need for any welded or similar fusion bonded connection 16 as employed in the prior art. In turn, this eliminates problems with regard to cleanliness, misalignment, and concern with controlling the coupling nut during the welding, electropolishing or plating operation of the prior art first gland to stub 18. With the teachings of the subject invention, the gland can be electropolished before the nut is positioned in place. This eliminates prior requirements for special handling of the coupling nut during the electropolishing process.

In contrast, the split nut halves 60, 62 of the present invention are received over the first gland and located so that the radial shoulders 64 abuttingly engage the rear radial face of the shoulder. Since the nut halves are split, they can be advanced in split, radially spaced relation over the first gland in a direction proceeding from the end face 20 toward the shoulder 24 without complication. Once positioned behind the shoulder, the nut halves are radially brought together to cooperate with the rear, radial face of the shoulder 24 of the first gland. Thereafter, the outer body 80 is advanced axially over the end face 20 of the first gland whereby threaded regions 70, 82 of the split nut halves and body member, respectively, cooperate to interconnect the three components of the new coupling assembly. Continued relative rotation between the split nut halves and the body member advances the threaded region 70 into the body member until a radial outer portion 86 of the shoulder 64 abuts the first end of the body member (FIG. 2). At this juncture, the new coupling assembly serves the same function as the coupling nut of the prior art arrangement. That is, threaded region 84 cooperates with the external threaded region 34 of the second gland 32 to complete make-up between the first and second glands and provide a sealed interface on opposite faces of the gasket 40.

Figure 4:
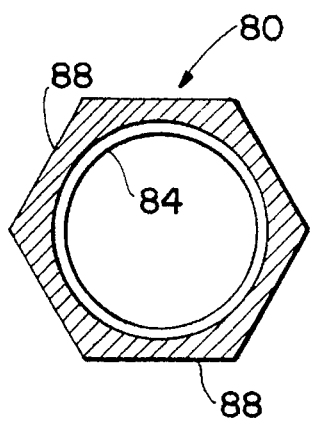
FIG. 4 is an end view of the body member taken generally along the lines 4—4 of FIG. 3.

To facilitate make-up of the coupling assembly, the body member 80 includes tool flats 88 on its exterior. Preferably, two or more tool flats are used, although a hexagonal outer configuration is commonly used in the industry (FIG. 4).

Figures 5, 6:
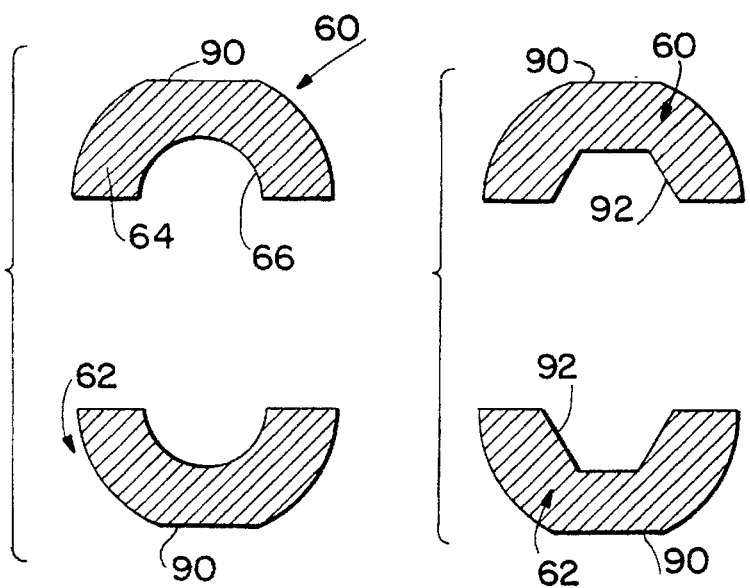
FIG. 5 is an end view of the split connection member taken generally along the lines 5—5 of FIG. 3.
FIG. 6 is an end view of an alternative embodiment similar to FIG. 5.

In a similar manner, tool flats 90 are preferably provided on an external surface of the split nut halves. As best shown in FIGS. 5 and 6, each split nut half has a tool flat 90 so that when assembled, they form diametrically opposite tool-engaging surfaces. As will be understood by one skilled in the art, still other tool flat arrangements or methods and structures for engaging the components can be used without departing from the scope and intent of the subject invention.

As additionally shown, an inner recess 66 (FIG. 5) can be modified to a non-round configuration 92 (FIG. 6). If the first gland has similarly configured surface, relative rotation between the split nut halves and the gland can be eliminated.

Figure 7:
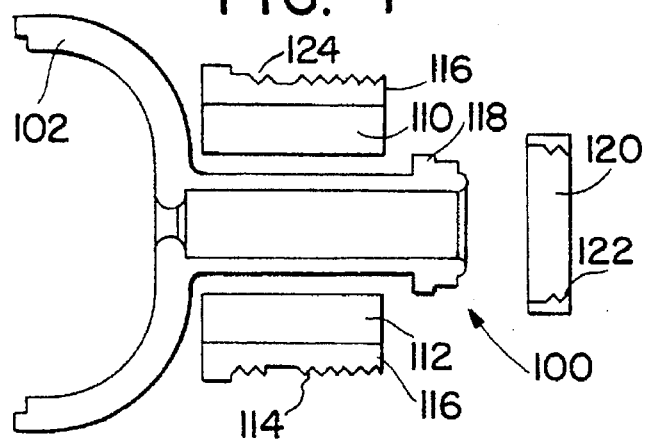
FIG. 7 is an exploded view of a similar split connection assembly for a male nut.
Figure 8:
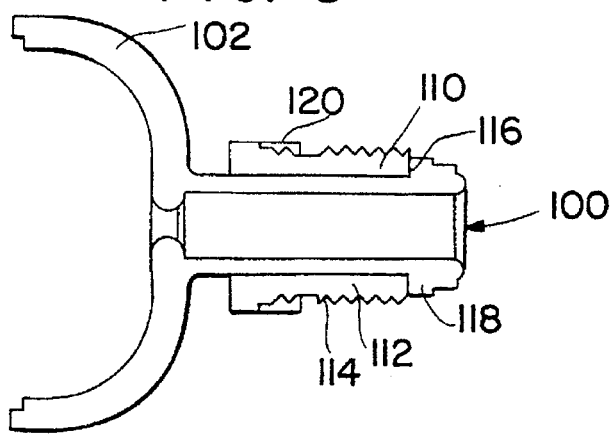
FIG. 8 is a longitudinal cross-sectional view of the assembled coupling assembly of FIG. 7.
Figure 9:
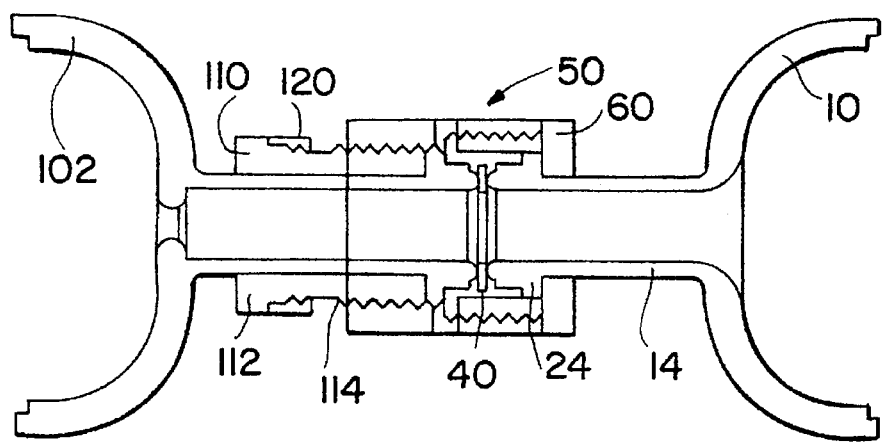
FIG. 9 is a cross-sectional view of an assembled fluid coupling employing split connection members in association with both coupling glands.

FIGS. 7-9 illustrate the applicability of this invention to related coupling assemblies. Particularly, a second coupling gland 100 is integrally formed with a fluid component 102, such as by machining the second gland from the same stock that forms the fluid component. Also, the external threaded region 34 of the prior embodiment is eliminated with the embodiment of FIGS. 7-9 and instead the second coupling gland is identical to the previously described first coupling gland. Accordingly, the separate, split connection members or male split nut halves 110, 112 include an external threaded region 114 that together define the threads that cooperate with the internal threads of the coupling nut associated with the first gland.

In the preferred arrangement as shown, one end of the split male nut halves define a radial shoulder 116 that abuttingly engages a radial shoulder 118 of the second gland. A retaining collar 120 is dimensioned for receipt over the seal face of the second gland and toward the shoulder for cooperative engagement with the split male nut halves. The retaining collar can be of any suitable construction such as a push-on ring (not shown) or a ring that is internally threaded at 122 for cooperation with an additional threaded region 124 on the split male nut halves. Any suitable structural arrangement that secures the split nut halves together and can be easily positioned in place over the second gland may be used in accordance with the teachings of this invention.

In accordance with a preferred embodiment of this invention, the individual components of the coupling assembly are all formed of 300 series stainless steel. This does not limit the invention, but rather is a preferred material for use in special environments. Likewise, other thread pitch and hand specifications for the threaded regions can be used without departing from the overall scope and intent of the subject invention.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In a fluid coupling of the type including first and second members, each member having a longitudinal fluid passage therethrough that terminates in an end face that extends generally perpendicular to the fluid passage, each end face having an annular sealing bead extending therefrom and toward the other end face, a shoulder of a first predetermined diameter on the first member spaced inwardly from the end face and a connection member having an outer body and first and second inner members operatively engaged to and received in the outer body that cooperatively define a shoulder of a second predetermined diameter less than the first predetermined diameter that cooperates with the first member shoulder, and the outer body having a first threaded region for selective threaded engagement with a threaded region operatively associated with the second member, the improvement comprising:

the first and second inner members of the connection member being separated from one another along a generally longitudinal axis, the connection member being positioned over the first member in a direction from the end face toward the shoulder and the outer body having a through opening with a diameter greater than the first predetermined dimension of the first member shoulder.

2. The improvement as defined in claim 1 wherein the first and second inner members, when assembled, have a threaded outer region and the outer body has a second, inner threaded region that engages the outer threaded region on the assembled first and second inner members.

3. The improvement as defined in claim 2 wherein the second member includes split connection portions that allow the connection member to be positioned thereover in a direction from the end face of the second member toward the shoulder thereby engaging the threaded region of the second member.

4. The improvement as defined in claim 2 wherein the second member is integral to an associated fluid component.

5. The improvement as defined in claim 4 wherein the first and second threaded regions of the outer body have opposite hand threads.

6. The improvement as defined in claim 4 wherein the first and second threaded regions of the outer body have different pitches.

7. The improvement as defined in claim 6 wherein the first and second threaded regions of the outer body have opposite hand threads.

8. The improvement as defined in claim 1 wherein the outer body has tool flats adapting the connection member for engagement by an associated tool.

9. The improvement as defined in claim 1 wherein the split connection members of the first member have tool flats which allow engagement by an associated tool.

10. A coupling assembly for connecting together first and second glands of a fluid system after the glands have been secured to associated components of the fluid system, the first gland having a radial shoulder and the second gland having a threaded region, the coupling assembly comprising:

first and second split connection members that define a radial shoulder that abuttingly engages the radial shoulder of the first gland and that have a threaded region having a first, preselected pitch and hand; and a body member removably secured to the first and second connection members, the body member having a first threaded region that operatively engages the threaded region of the second gland, and the body member having a second threaded region with the same pitch and hand that operatively engages the threaded region of the first and second connection members.

11. The coupling assembly as defined in claim 10 wherein the shoulder defined by the first and second connection members has a first predetermined diameter less than a second predetermined diameter of the radial shoulder of the first gland.

12. The coupling assembly as defined in claim 10 wherein the body member first threaded region and the second threaded region have different pitches.

13. The coupling assembly as defined in claim 10 wherein the body member first threaded region and the second threaded region have different hand.

14. The coupling assembly as defined in claim 10 wherein the body member first threaded region and the second threaded region have different pitches and hand.

15. The coupling assembly as defined in claim 10 wherein the body member is circumferentially continuous.

16. The coupling assembly as defined in claim 10 wherein the body member includes at least a pair of tool flats on an external surface thereof adapted for engagement by an associated tool.

17. The coupling assembly as defined in claim 10 wherein the first and second connection members are substantially identical.

* * * * *